May 25, 1948. J. H. LINK 2,442,050
SHOCK ABSORBER FOR RAILWAY CAR END BUFFERS
Filed Nov. 23, 1944 2 Sheets-Sheet 1
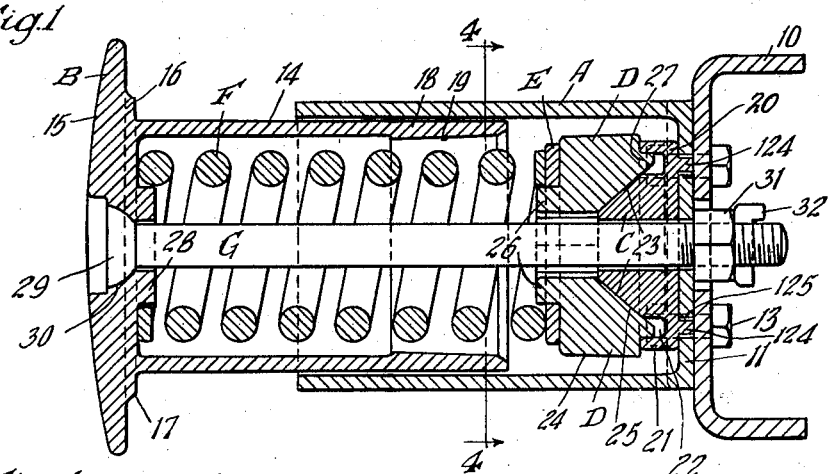
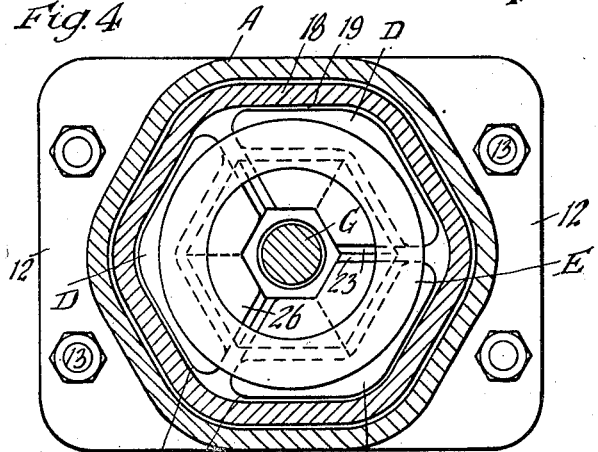
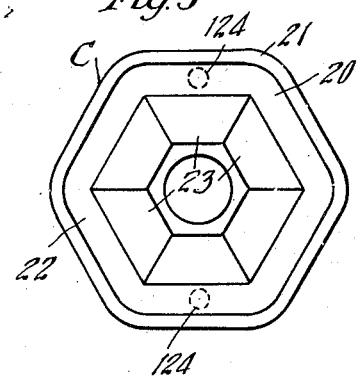
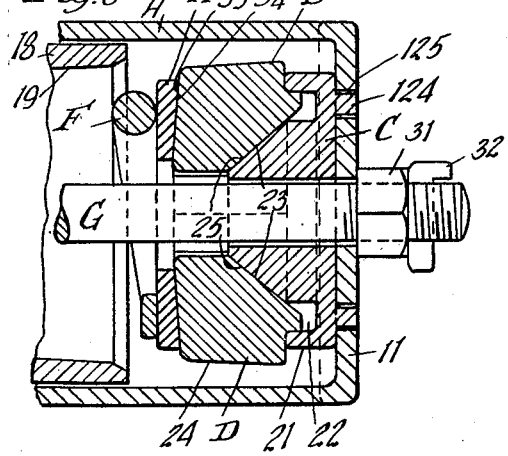
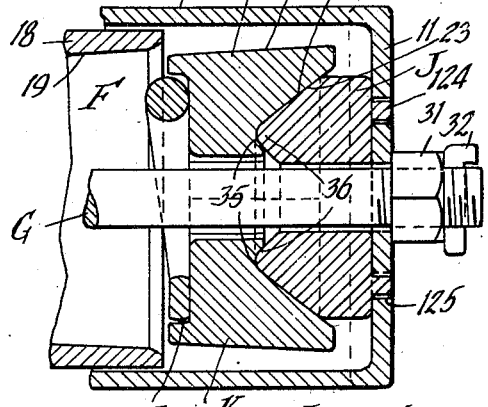
Inventor
John H. Link
By Henry Fuchs
Atty.

May 25, 1948.  J. H. LINK  2,442,050
SHOCK ABSORBER FOR RAILWAY CAR END BUFFERS
Filed Nov. 23, 1944  2 Sheets-Sheet 2

Inventor
John H. Link
By Henry Fuchs
Atty.

Patented May 25, 1948

2,442,050

UNITED STATES PATENT OFFICE 2,442,050

SHOCK ABSORBER FOR RAILWAY CAR END BUFFERS

John H. Link, Merion, Pa., assignor to W. H. Miner, Inc., Chicago, Ill., a corporation of Delaware Application November 23, 1944, Serial No. 564,755

12 Claims. (Cl. 213—221)

This invention relates to improvements in shock absorbers and more particularly to shock absorbers employed as buffers for railway cars.

One object of the invention is to provide a simple and efficient shock absorber employed as a buffer for railway cars having preliminary spring action to absorb the lighter shocks to which the mechanism is subjected and frictional resistance to absorb the heavier shocks.

Another object of the invention is to provide a buffer mechanism comprising a buffer housing, a buffer head including a friction casing slidingly telescoped within the housing, a friction clutch cooperating with the friction casing, and a spring resistance, wherein the spring resistance provides the preliminary spring action to absorb the lighter shocks and also serves to resist relative movement of the friction casing and clutch to produce the high frictional resistance to absorb the heavier shocks.

A still further object of the invention is to provide a mechanism as set forth in the preceding paragraph, wherein the friction clutch becomes operative to provide high frictional resistance after the spring resistance has performed its function as a preliminary spring.

Yet another object of the invention is to provide a buffer mechanism comprising a buffer housing, a combined buffer head and friction casing slidingly telescoped within the housing, a friction clutch held against inward movement with respect to the housing, and a spring resistance reacting between the friction clutch and the combined buffer head and friction casing, yieldingly opposing inward movement of the combined buffer head and casing with respect to the housing, and inward movement of the friction clutch with respect to the friction casing, wherein the friction clutch and friction casing have lost motion with respect to each other during the preliminary spring action of the mechanism and are brought into operative engagement with each other after partial compression of the spring resistance, thereby providing frictional resistance through relative movement therebetween during the remainder of the compression stroke of the mechanism to absorb the heavier shocks.

Other objects of the invention will more clearly appear from the description and claims hereinafter following.

Figure 2:
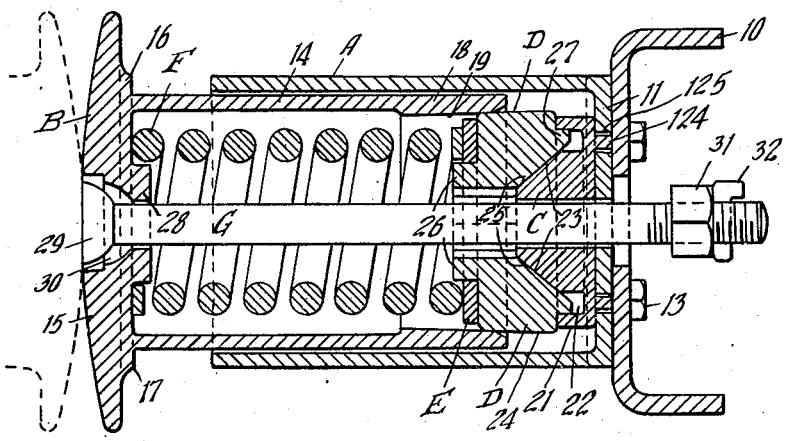
Figure 3:
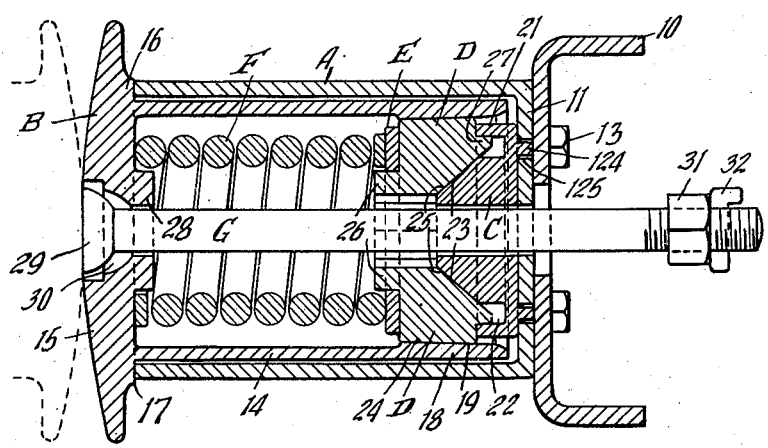

In the drawings forming a part of this specification, Figure 1 is a longitudinal, vertical sectional view of my improved buffer mechanism in position on the end of a car. Figures 2 and 3 are views similar to Figure 1, Figure 2 illustrating the mechanism partly compressed and Figure 3 illustrating the same under full compression. In Figures 2 and 3 the buffer head of an adjacent car is indicated in dotted lines. Figure 4 is a transverse, vertical sectional view, corresponding substantially to the line 4—4 of Figure 1, said view being on an enlarged scale. Figure 5 is a front elevational view of the wedge member employed in my improved mechanism as shown in Figure 1, on an enlarged scale. Figure 6 is a view similar to Figure 1, on an enlarged scale, of the rear end portion of the buffer mechanism, illustrating another embodiment of the invention. Figure 7 is a view similar to Figure 4, illustrating still another embodiment of the invention.

In said drawings, 10 indicates a portion of the end wall of a railway car, the portion illustrated being to one side of the longitudinal center line of the car and having my improved buffer mechanism mounted thereon. As will be understood, the buffer mechanism is duplicated on the other side of the end of the car and the two mechanisms cooperate in a well-known manner with a pair of similar buffer mechanisms on the end of an adjacent car.

Referring first to the embodiment of the invention illustrated in Figures 1 to 5 inclusive, my improved buffer mechanism comprises broadly a housing A; a combined buffer head and friction casing B; a wedge member C; three friction shoes D—D—D; a spring follower E; a spring resistance F; and a retainer bolt G.

The housing A is in the form of a substantially tubular shell of hexagonal, interior and exterior cross section, open at its front end, and closed at its rear end by a vertical transverse wall 11. The wall 11 projects laterally outwardly of the housing A, thereby providing flanges 12—12 for mounting the housing on the end of the car. The housing is preferably secured to the end of the car by retainer bolts 13—13, which extend through the flanges 12 and the wall 10 of the car.

The combined buffer head and friction casing B includes the friction casing 14 and the buffer head proper 15. The friction casing 14 is also of hexagonal, interior and exterior, transverse cross section and is open at its rear end and closed at its front end, the buffer head proper 15 forming the front wall of the casing. The front wall of the casing projects laterally outwardly of the same, as clearly shown in Figure 1, whereby the enlarged buffer head proper is provided. The casing has the outer wall thickened at the forward end where it projects from the buffer head proper, as indicated by 16, thereby providing an annular, laterally outwardly projecting stop shoulder 17 adapted to engage the front end of the housing to arrest movement of the casing inwardly of the housing and thereby limiting compression of the mechanism. The walls at the rear end portion of the casing 14 are inwardly enlarged, thereby providing the friction shell section proper of the casing, which section is indicated by 18. The friction shell section 18 is of hexagonal, interior cross section, thereby presenting six interior faces. Each set of adjacent, interior faces together form a V-shaped friction surface 19 which extends lengthwise of the shell. The V-shaped friction surfaces 19—19—19 converge forwardly and inwardly of the casing 14. The surfaces 19 are slightly beveled off at the open or rear end of the casing, as clearly shown in Figures 1, 2, and 3, to facilitate entrance of the friction shoes D—D—D. The hexagonal casing 14 slidingly fits within the housing A, these parts being thus locked against relative rotation.

The wedge C is in the form of a block of hexagonal, transverse cross section. At the rear end, the block C is provided with a plate-like section 20 which projects laterally therefrom, and has a peripheral flange or shoulder 21 at right angles thereto. The flange or shoulder 21 is formed by straight sections, which together define a continuous flange of hexagonal outline. The hexagonal flange 21 is spaced from the block portion of the wedge, thereby providing a peripheral seat in the form of a hexagonal channel 22. At the inner end, the block C presents six inwardly converging, flat wedge faces 23, which are arranged symmetrically about the central longitudinal axis of the mechanism. Adjacent faces 23—23 of the wedge block together present a wedge face of V-shaped, transverse cross section. The wedge C and the housing A are locked together against relative rotation, the plate section 20 of the wedge being provided with a pair of projecting, cylindrical lugs 124—124 seated in the openings 125—125 in the rear wall 11 of the housing.

The shoes D, which are three in number, surround the wedge block and each shoe has an outer V-shaped friction surface 24 adapted to engage with one of the V-shaped friction surfaces 19 of the casing 14 of the combined buffer head and friction casing B. On the inner side, at the rear end thereof, each shoe has a V-shaped wedge face 25 engaging with two adjacent faces 23—23 of the wedge C. At the forward end, each shoe has an outwardly projecting lug 26 thereon, which has the lateral outer face thereof rounded. The projections or lugs 26—26—26 of the three shoes together form, in effect, an annular boss. At the rear end, each shoe has a rearwardly extending lug 27, which is in the form of a rib. The rib 27 of each shoe is of V-shaped form and the three V-shaped ribs of the three shoes together form, in effect, a continuous flange which is seated in the channel 22 of the plate section of the wedge block C, thereby limiting lateral outward movement or separation of the shoes. Sufficient clearance is provided between the ribs or lugs 27 of the shoes and the inner wall of the channel-shaped seat to permit a certain amount of lateral inward movement of the shoes toward the central axis of the mechanism. As will be evident, the interengaging V-shaped wedge faces of the wedge block C and the shoes D—D—D prevent relative rotation of the shoes with respect to the wedge. Further, the wedge C being locked to the housing A, prevents relative rotation of the shoes with respect to the housing. This assures registration of the friction surfaces of the shoes with the friction surfaces of the friction casing 14 when the mechanism is compressed to enter the shoes within the open end of the casing, the casing being held against relative rotation with respect to the housing A, as hereinbefore pointed out.

The spring follower E is in the form of a ring bearing on the inner ends of the shoes and surrounding the projections or lugs 26—26—26 of the three shoes, thereby preventing tilting of the latter.

The spring F is in the form of a single coil interposed between the spring follower ring E and the front wall of the casing 14 of the combined buffer head and friction casing B. The front end of the spring F is centered by an inwardly projecting boss 28 on the front wall of the casing, and the rear end thereof is centered by the lugs 26—26—26 which project entirely through the ring E and into the end of the spring.

The retainer bolt G has a head 29 at the front end thereof, which is seated in a pocket 30, provided in the buffer head 15. The shank of the bolt G extends through the spring F and aligned openings in the wedge C and the wall 11 of the housing A. The rear end of the bolt G is threaded to receive the nut 31, which bears on the end wall 11 of the housing and is accommodated in a suitable opening provided in the end wall 10 of the car. The nut 31 is preferably locked against removal by a key 32 extending through the threaded end portion of the shank of the bolt. The bolt G holds the mechanism assembled and under slight initial compression.

The operation of my improved buffer mechanism is as follows: Upon inward movement of the combined buffer head and friction casing B through pressure exerted thereon by any object, such as the buffer head of an adjacent car, the spring F is compressed against the friction shoes which are held against rearward movement by the wedge C shouldered against the rear wall of the housing A. The lighter shocks are thus absorbed by the spring F. As the buffer head is moved inwardly of the housing A when heavier shocks are encountered, the open rear end of the friction casing 14 of the combined buffer head and friction casing B will be engaged over the friction shoes, as shown in Figure 2, and the friction casing will be forced to slide rearwardly with respect to the friction shoes until the mechanism has been fully compressed, as shown in Figure 3. During this action, the pressure of the spring F on the shoes D forces the latter against the wedge faces of the wedge block C, thereby causing the shoes to spread apart into tight frictional engagement with the interior friction surfaces of the casing. As will be evident, high frictional resistance is thus provided to absorb the heavier shocks during the inward sliding movement of the friction casing 14 with respect to the friction shoes D—D—D. The clutch, comprising the wedge C and the friction shoes D—D—D, is held contracted by the shouldered engagement of the shoes with the flanges 12—12 of the plate section of the wedge block C and by shouldered engagement with the follower ring E so that it will freely enter between the friction surfaces of the casing 14 as the casing is engaged over the shoes. The beveled ends of the friction surfaces of the casing facilitate this action in the event of slight disalignment of the parts. When the actuating force is removed, the expansive action of the spring F restores all of the parts to the normal full release position shown in Figure 1, outward movement of the combined buffer head and friction casing B being positively limited by the retainer bolt G.

Referring next to the embodiment of the invention illustrated in Figure 6, the construction is the same as that shown in Figures 1 to 5 inclusive, with the exception that the spring follower ring has wedging engagement with the shoes instead of shouldered engagement with lugs on the shoes, to prevent tilting of the latter. Similar parts are indicated by the same reference characters in Figure 6 as employed for those parts in Figures 1 to 5 inclusive. The spring follower ring in Figure 6 is indicated by H. The ring H and the shoes D—D—D have cooperating blunt wedge faces 33 and 34, respectively. The wedge faces 33 and 34 are laterally inclined outwardly, thus wedging the shoes toward the central longitudinal axis of the mechanism. As will be evident, due to the blunt wedging engagement between the spring follower ring and the shoes, the front ends of the shoes are held against tilting or spreading.

Referring next to the embodiment of the invention illustrated in Figure 7, the design is the same as that disclosed in Figures 1 to 5 inclusive, with the exception that the spring follower ring is omitted and the means for limiting spreading of the shoes is of slightly different design. In Figure 7, the wedge block, which is identical with the wedge block C except that the flange 21 is omitted and the wedge structure modified to limit spreading of the shoes as hereinafter pointed out, is indicated by J. The friction shoes, which are also slightly modified, are indicated by K—K—K. The shoes K—K—K have seats 35—35—35 at the inner ends of the wedge faces 25—25—25, receiving projecting portions 36—36—36 at the front ends of the wedge faces 23 of the wedge block J. As shown, the central portion of the wedge block J is cut out to provide the projections 36. The projections 36 normally engage in the seats 35 of the shoes and limit spreading of the latter by shouldered engagement of the seats with the projections of the wedge. The spring resistance, which is also indicated by F in Figure 7, has its rear end seated in a pocket 37 provided at the inner ends of the shoes, said pocket being formed partly on each of the shoes.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a friction casing having inwardly converging friction surfaces; of a friction clutch; means for holding said clutch assembled and limiting expansion of the same, said clutch and casing being normally spaced apart lengthwise of the mechanism and being movable toward and away from each other in lengthwise direction, said clutch being slidably engageable within the casing after a predetermined compression of the mechanism; and spring means within the casing yieldingly resisting inward movement of the clutch with respect to the casing.

2. In a shock absorber, the combination with a housing; of a friction casing slidingly telescoped within the housing, said casing having interior friction surfaces; a friction clutch unit including a wedge block held against inward movement with respect to the housing, and friction shoes in wedging engagement with said block, said shoes having friction surfaces engageable with the friction surfaces of the casing, said casing being normally spaced from the shoes and movable toward said shoes during compression of the mechanism, said casing being engaged with the shoes after a predetermined compression of the mechanism; means for holding said shoes assembled with the wedge block and limiting radial outward displacement of the same with respect to the wedge block; and spring means within the casing yieldingly opposing movement of the casing and shoes toward each other.

3. In a shock absorber, the combination with a friction casing; of a friction clutch slidingly engageable within the casing, said clutch being normally spaced from said casing to provide lost motion therebetween, said clutch and casing being movable toward and away from each other and engageable with each other after said lost motion has been taken up; said clutch including a central wedge member and friction shoes surrounding said wedge member in wedging engagement therewith; means for holding said shoes assembled with said wedge member and limiting expansion of said clutch; and spring means within the casing yieldingly resisting inward movement of the clutch.

4. In a shock absorber, the combination with a housing; of a friction casing slidingly telescoped within the housing, said casing having interior friction surfaces; a friction clutch normally spaced from the casing and held against inward movement with respect to the housing, said casing and clutch being movable toward and away from each other lengthwise of the mechanism, said clutch including a central wedge block and friction shoes surrounding said block, said shoes having friction surfaces engageable with the friction surfaces of the casing; means for holding said shoes assembled with the wedge block and limiting expansion of said clutch; and spring means within the casing yieldingly opposing relative movement of the casing and clutch toward each other.

5. In a shock absorber, the combination with a housing; of a friction casing slidingly telescoped within the housing, said casing having interior friction surfaces; a friction clutch normally spaced from the casing and held against inward movement with respect to the housing, said casing and clutch being movable toward and away from each other lengthwise of the mechanism, said clutch including a central wedge block and friction shoes surrounding said block, said shoes having friction surfaces engageable with the friction surfaces of the casing, said shoes having shouldered engagement with the wedge to limit lateral spreading of the shoes; and spring means within the casing yieldingly opposing relative movement of the casing and clutch toward each other.

6. In a shock absorber, the combination with a housing; of a friction casing slidingly telescoped within the housing; said casing having interior friction surfaces; a friction clutch normally spaced from the casing and held against inward movement with respect to the housing, said casing and clutch being movable toward and away from each other lengthwise of the mechanism, said clutch including a central wedge block and friction shoes surrounding said block, said shoes having friction surfaces engageable with the friction surfaces of the casing; means on said wedge having shouldered engagement with the shoes for limiting lateral spreading of the shoes; and spring means within the casing yieldingly opposing relative movement of the casing and clutch toward each other.

7. In a shock absorber, the combination with a housing; of a friction casing slidingly telescoped within the housing, said casing having interior friction surfaces; a friction clutch normally spaced from the casing and held against inward movement with respect to the housing, said casing and clutch being movable toward and away from each other lengthwise of the mechanism, said clutch including a central wedge block and friction shoes surrounding said block, said shoes having friction surfaces engageable with the friction surfaces of the casing; means for limiting lateral spreading of the shoes including cooperating shoulders on the wedge and shoes at one set of ends of the latter and means at the other set of ends of said shoes holding said last named set of ends from tilting; and spring means within the casing yieldingly opposing relative movement of the casing and clutch toward each other.

8. In a shock absorber, the combination with a housing open at its front end and closed at its rear end by a transverse wall; of a friction clutch including a central wedge block bearing on said wall of the housing and friction shoes surrounding said block and in wedging engagement therewith, said shoes having outer friction surfaces; a retaining flange on said wedge having shouldered engagement with the rear ends of the shoes to limit spreading of the latter; a friction casing open at its rear end, said casing being slidingly telescoped within said housing, said casing having interior friction surfaces at its open rear end engageable with the friction surfaces of the shoes, the rear end of said casing being normally spaced from the front ends of said shoes; lugs at the front ends of said shoes; a spring follower ring bearing on the front ends of the shoes and surrounding said lugs in shouldered engagement therewith; and a spring within said casing yieldingly opposing inward movement of said shoes with respect to the casing, said spring bearing on said spring follower ring.

9. In a shock absorber, the combination with a housing open at its front end and closed at its rear end by a transverse wall; of a friction clutch including a central wedge block bearing on said wall of the housing and friction shoes surrounding said block and in wedging engagement therewith, said shoes having outer friction surfaces; a retaining flange on said wedge having shouldered engagement with the rear ends of the shoes to limit spreading of the latter; a friction casing open at its rear end, said casing being slidingly telescoped within said housing, said casing having interior friction surfaces at its open rear end engageable with the friction surfaces of the shoes, the rear end of said casing being normally spaced from the front ends of said shoes; a spring follower having blunt wedging engagement with the front ends of the shoes for wedging said shoes laterally inwardly; and a spring within said casing yieldingly opposing inward movement of said shoes with respect to the casing, said spring bearing on said spring follower ring.

10. In a shock absorber, the combination with a housing open at its front end and closed at its rear end by a transverse wall; of a friction clutch including a central wedge block bearing on said wall of the housing and friction shoes surrounding said block and in wedging engagement therewith, said shoes having outer friction surfaces; a wedge seat on each of said shoes; projections on said wedge engaged in said seats to limit lateral spreading of said shoes; cooperating wedge faces on said projections of the wedge and seats of the shoes for spreading said shoes apart; a friction casing open at its rear end, said casing being slidingly telescoped within said housing, said casing having interior friction surfaces at its open rear end engageable with the friction surfaces of the shoes, the rear end of said casing being normally spaced from the front ends of said shoes; lugs at the front ends of said shoes; a spring follower ring bearing on the front ends of the shoes and surrounding said lugs in shouldered engagement therewith; and a spring within said casing yieldingly opposing inward movement of said shoes with respect to the casing, said spring bearing on said spring follower ring.

11. In a shock absorber, the combination with a friction casing having inwardly converging, interior friction surfaces; of a friction clutch normally spaced from the casing, said clutch and casing being movable relatively toward each other lengthwise of the mechanism, said clutch including a central wedge block and friction shoes surrounding said block, said shoes having friction surfaces engageable with the friction surfaces of the casing; means for holding said shoes assembled with the wedge block and limiting expansion of said clutch; and spring means within the casing yieldingly opposing relative movement of the casing and clutch toward each other.

12. In a shock absorber, the combination with a friction casing having inwardly converging, interior friction surfaces; of a friction clutch normally spaced from the casing, said casing and clutch being movable toward and away from each other lengthwise of the mechanism, said clutch including a central wedge block and friction shoes surrounding said block, said shoes having friction surfaces engageable with the friction surfaces of the casing, said shoes having shouldered engagement with the wedge to limit lateral spreading of the shoes; and spring means within the casing yieldingly opposing relative movement of the casing and clutch toward each other.

JOHN H. LINK.

REFERENCES CITED

The following references are of record in the file of this patent:

UNITED STATES PATENTS

| Number | Name | Date |
|---|---|---|
| 731,116 | Myer | June 16, 1903 |
| 1,129,394 | Hughs | Feb. 23, 1915 |
| 1,335,290 | Myers | Mar. 30, 1920 |
| 1,747,238 | Gross | Feb. 18, 1930 |
| 2,331,458 | Dath | Oct. 12, 1943 |
| 2,340,335 | Marsh | Feb. 1, 1944 |
| 2,411,630 | Lehman et al. | Nov. 26, 1946 |
| 2,419,254 | Dath | Apr. 22, 1947 |